United States Patent
Sakai et al.

(10) Patent No.: US 10,124,514 B2
(45) Date of Patent: Nov. 13, 2018

(54) RESIN MOLDING MOLD

(71) Applicant: TANAZAWA HAKKOSHA CO., LTD., Osaka (JP)

(72) Inventors: Masayuki Sakai, Higashiosaka (JP); Hisao Aota, Higashiosaka (JP)

(73) Assignee: TANAZAWA HAKKOSHA CO., LTD., Osaka (JP)

( * ) Notice: Subject to any disclaimer, the term of this patent is extended or adjusted under 35 U.S.C. 154(b) by 103 days.

(21) Appl. No.: 15/320,981

(22) PCT Filed: Apr. 15, 2016

(86) PCT No.: PCT/JP2016/062083
§ 371 (c)(1),
(2) Date: Dec. 21, 2016

(87) PCT Pub. No.: WO2017/018006
PCT Pub. Date: Feb. 2, 2017

(65) Prior Publication Data
US 2017/0197336 A1    Jul. 13, 2017

(30) Foreign Application Priority Data
Jul. 30, 2015   (JP) .............................. 2015-151141

(51) Int. Cl.
*B29C 59/02*   (2006.01)
*B29C 33/38*   (2006.01)
(Continued)

(52) U.S. Cl.
CPC .......... *B29C 33/38* (2013.01); *B29C 33/3807* (2013.01); *B29C 33/424* (2013.01);
(Continued)

(58) Field of Classification Search
CPC ..... B29C 33/38; B29C 33/56; B29C 33/3807; B29C 33/424; B29C 59/02; B29C 37/0053; B29K 2903/00
See application file for complete search history.

(56) References Cited

U.S. PATENT DOCUMENTS 6,077,472 A   6/2000   Kataoka et al.

FOREIGN PATENT DOCUMENTS

JP    S49-9588 A    1/1974
JP    S53-6358 A    1/1978
(Continued)

OTHER PUBLICATIONS

Hidetoshi Yokoi et al., "Analysis on Generation Process of Irregular Gloss Pattern Appeared on Textured Mold Surface", Proceedings of the 23rd Plastic Molding Processing Society, pp. 131-132, 2012.

*Primary Examiner* — Yogendra N Gupta
*Assistant Examiner* — Ninh Le
(74) *Attorney, Agent, or Firm* — Rabin & Berdo, P.C.

(57) ABSTRACT

To provide a resin molding mold capable of forming a resin molded product having embossing in which by controlling appearance of gloss, its texture is improved, and the resin molded product is prevented from occurrence of white blurring on the surface on which the molded embossing is formed.

A resin molding mold in accordance with the present application is used for molding a resin molded product having embossing formed thereon. The resin molding mold includes a molding mold and a buffer layer formed on an inside mold surface of the molding mold. The buffer layer is formed by a mixture of a thermosetting resin and fine particles having substantially spherical shapes. The fine particles have a bulk specific gravity in a range from 0.4 g/ml or more to 0.9 g/ml or less, and on the surface of the (Continued)

buffer layer, a plurality of gloss adjusting convex portions having substantially spherical shapes derived from the fine particles are formed.

2 Claims, 2 Drawing Sheets

(51) Int. Cl.
    *B29C 37/00*     (2006.01)
    *B29C 33/42*     (2006.01)
    *B29C 33/56*     (2006.01)

(52) U.S. Cl.
    CPC .......... *B29C 33/56* (2013.01); *B29C 37/0053* (2013.01); *B29C 59/02* (2013.01); *B29K 2903/00* (2013.01); *B29K 2905/00* (2013.01); *B29K 2995/0018* (2013.01); *B29K 2995/0024* (2013.01)

(56) References Cited

FOREIGN PATENT DOCUMENTS

| | | | | |
|---|---|---|---|---|
| JP | H10278148 A | * | 10/1998 | ............. B32B 25/02 |
| JP | H11-320627 A | | 11/1999 | |
| JP | 4909271 B2 | * | 4/2012 | |
| WO | WO-95/35194 A1 | | 12/1995 | |
| WO | WO-2007/015390 A1 | | 2/2007 | |

* cited by examiner (a)  (b)

RESIN MOLDING MOLD

FIELD OF THE INVENTION

This invention relates to a resin molding mold, and more particularly concerns such a resin molding mold for molding a resin molded product that is prevented from occurrence of failure in external appearance on its surface having embossing formed thereon.

BACKGROUND OF THE INVENTION

Conventionally, for example, resin molded products serving as interior parts for automobiles, in particular, instrument-panels, garnishes, etc., disposed around windows, need to have a high-quality feeling, and those resin molded products that have reduced gloss to prevent a window reflection have been demanded. With respect to such resin molded products, a surface machining process referred to as an embossing process is carried out on a molding mold, and by using this mold, those resin molded products are produced. Thus, on the surface of each of these resin molded products, a minute pattern of concavo-convex portions referred to as embossing is formed. Then, the surface with embossing formed thereon has reduced gloss (that is, reduced gloss value) so that delicate shadows and feeling to the touch are given to its surface.

In order to obtain the above-mentioned embossing, satin embossing is formed by an etching process, or the inside surface of the molding mold subjected to the embossing process is further roughened by a sand-blasting process so as to carry out the gloss value reducing treatment (for example, see Patent Document 1).

PRIOR-ART DOCUMENTS

Patent Document

Patent Document 1: Japanese Patent Application Laid-Open No. 11-320627

Non-Patent Document

Non-Patent Document 1: "Analysis of Transfer Irregularity Generation Mechanism on Embossed Surface" (Speech Proceedings of the 23$^{rd}$ Plastic Molding Processing Society, pages 131-132, 2012) written by Hidetoshi Yokoi and Norimichi Masuda

SUMMARY OF THE INVENTION

Problems to be Solved by the Invention

However, in the case when the inside surface of the molding mold subjected to the embossing process is roughened by sandblasting, irregularities sometimes occur in a region to which glass beads are blasted or the inside surface of the molding mold is sometimes brought into a state with steep ridges. For this reason, when the resin molded product is cooled and contracted, scratches (hereinafter, referred to as "galling") caused by protrusions on the inside surface of the molding mold relative to a drawing direction at the time of drawing a resin molded product from the molding mold or scratches caused by tension or rubbing given to the resin molded product tend to occur, making it difficult to reduce gloss entirely in a stable manner from the surface of the resin molded product.

Moreover, in recent years, it has been found that in some of the resin molded products having the above-mentioned embossing formed thereon, a defective appearance, that is, a so-called "white blurring" (or "transfer irregularities") in which when the surface having embossing is viewed in a specific direction, it looks blurred in white, is sometimes caused (for example, see Non-Patent Document 1). It is said that this "white blurring" is caused, for example, by the fact that the transferred shape of embossing is partially tilted with the result that when irradiated with light from the tilting direction, luminance becomes higher; however, at present, means for suppressing this "white blurring" has not yet been clearly established.

Therefore, the object of the present invention is to provide a resin molding mold which in a resin molded product having embossing, improves its texture by controlling gloss appearance, and can prevent the resin molded product from occurrence of white blurring on its surface having molded embossing formed thereon.

Means for Solving the Problem

A resin molding mold in accordance with the present invention is used for molding a resin molded product having embossing, and the resin molding mold is provided with a molding mold and a buffer layer formed on a mold surface of the molding mold, and the buffer layer is formed by a mixture of a thermosetting resin and fine particles having substantially spherical shapes, and the resin molding mold is characterized in that the fine particles have a bulk specific gravity in a range from 0.4 g/ml or more to 0.9 g/ml or less and in that on the surface of the buffer layer, a plurality of gloss adjusting convex portions having substantially spherical shapes derived from the fine particles are formed.

Moreover, in the resin molding mold in accordance with the present invention, the particle size of the fine particles is preferably set in a range from 1.0 μm or more to 15 μm or less.

Furthermore, the thickness of the buffer layer in accordance with the present invention is preferably set in a range from 1.0 μm or more to 20 μm or less, and is preferably made larger than the particle size of the fine particles.

In accordance with the resin molding mold of the present invention, since gloss adjusting convex portions having substantially spherical shapes are formed on the surface of the buffer layer of the resin molding mold, the mold surface of the molding mold is prevented from having a state with steep ridges. Therefore, by molding a resin molded product by carrying out an injection molding process using this resin molding mold, concave portions to be formed on an embossing formation surface of the resin molded product are formed with substantially spherical shapes; therefore, even when the resin molded product is contracted at the time of cooling, since it is possible to prevent scratches from occurring on the surface of the resin molded product due to tension or rubbing given to the resin molded product caused by galling at the time of drawing the resin molded product from the resin molding mold, a resin molded product having reduced gloss can be obtained, and a resin molded product capable of preventing white blurring from occurring on its embossing formation surface can also be obtained.

Moreover, when light is made incident on the surface of the resin molded product formed by using the resin molding mold, the incident light is reflected from inner surfaces of the concave portions having substantially spherical shapes of the resin molded product to form diffused light rays that are reflected in various directions. Since the incident light is randomly reflected, reflected light rays to reach the eyes of an observer become fewer. Since a large number of concave portions having substantially spherical shapes with different depths are formed on the surface of the resin molded product, the gloss of the entire resin molded product (gloss value) is lowered.

In this manner, since the surface of a resin molded product molded by using the resin molding mold in accordance with the present invention has a glossless surface characteristic, it is not necessary to further carry out a coating process on the corresponding resin molded product, and it becomes possible to obtain a desired resin molded product whose texture is improved by reducing gloss.

Moreover, in the case when the particle size of fine particles contained in the buffer layer is set in a range from 1.0 μm or more to 15 μm or less, since the concave portions to be formed by an embossing process are not buried, it is possible to prevent occurrence of galling or the like, while maintaining the shape of the embossing pattern of the resin molded product.

Furthermore, in the case when the thickness of the buffer layer is set in a range from 1.0 μm or more to 20 μm or less, and is also made larger than the particle size of the fine particles, it is possible to positively ensure the shape of a plurality of gloss adjusting convex portions having substantially spherical shapes derived from the fine particles on the surface of the buffer layer.

Effects of Invention

In accordance with the present invention, it is possible to provide a resin molding mold which in a resin molded product having embossing, improves its texture by controlling gloss appearance, and can prevent the resin molded product from occurrence of white blurring on its surface having molded embossing formed thereon.

These and other objects, features and advantages of the present invention will become apparent upon consideration of the following description of the preferred embodiments of the present invention taken in conjunction with the accompanying drawing.

BRIEF DESCRIPTION OF DRAWINGS

FIG. 4(a) is a front view, and FIG. 4(b) is a side view.

DETAILED DESCRIPTION OF THE INVENTION

1. Resin Molding Mold

Figure 1:
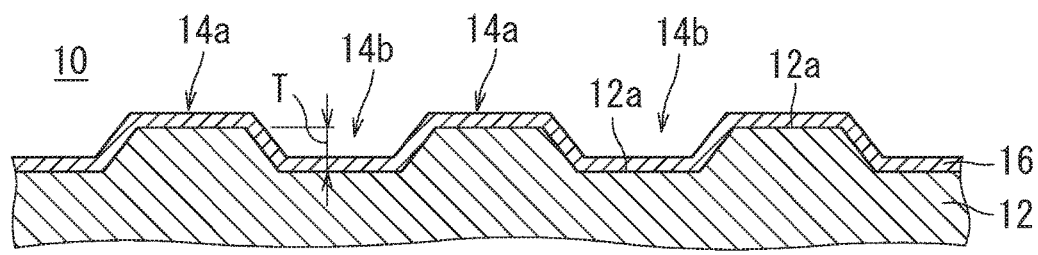
FIG. 1 is a cross-sectional illustration showing an example of a resin molding mold in accordance with the present invention.
Figure 2:
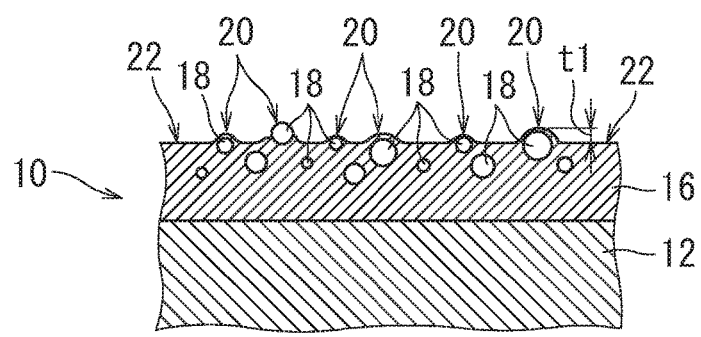
FIG. 2 is an enlarged cross-sectional view in which a portion corresponding to a buffer layer of the resin molding mold shown in FIG. 1 is enlarged.
Figure 3:
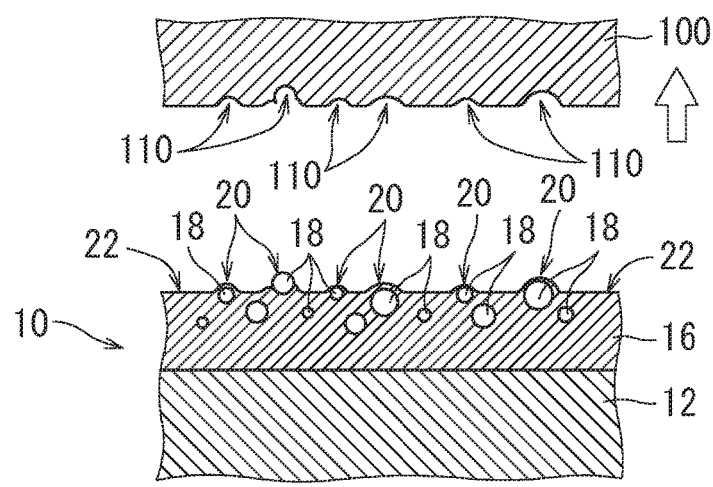
FIG. 3 is a cross-sectional illustration showing a state in which a resin molded product injection-molded by using the resin molding mold in accordance with the invention is drawn therefrom.

FIG. 1 is a cross-sectional illustration showing an example of a resin molding mold in accordance with the present invention, and FIG. 2 is an enlarged cross-sectional view in which a portion corresponding to a buffer layer of the resin molding mold shown in FIG. 1 is enlarged. FIG. 3 is a cross-sectional illustration showing a state in which a resin molded product injection-molded by using the resin molding mold in accordance with the invention is drawn therefrom.

A resin molding mold 10 includes a molding mold 12.

The molding mold 12 can be made of a material capable of being heated at least to 150° C., and is formed by using, for example, a metal material, such as iron steel material, aluminum, ZAS or the like, or a synthetic resin material. The mold surface 12a of the molding mold 12 is subjected to an embossing process, for example, by etching, with the result that an embossing formation convex portion 14a and an embossing formation concave portion 14b are formed. The maximum height T between the embossing formation convex portion 14a and the embossing formation convex portion 14b obtained by the embossing process is preferably set to 10 μm or more. When this is less than 10 μm, a portion of the embossing formation concave portion 14b is undesirably buried by a buffer layer 16 to be described later.

Moreover, a drawing gradient for use in injection-molding is formed in the molding mold 12. This drawing gradient is specified in relation to the maximum height T between the embossing formation convex portion 14a and the embossing formation concave portion 14b formed by the embossing process, and for example, when the maximum height T between the embossing formation convex portion 14a and the embossing formation concave portion 14b is 10 μm, it is set to about 1 degree.

The embossing process is a process for forming a concavo-convex shaped pattern, such as leather embossing, geometrical embossing, satin embossing or the like. The embossing pattern includes a leather embossing pattern, a skin texture pattern, a wood grain pattern, a satin pattern, a leaf vein pattern, a scale pattern, a marble pattern, a hair line pattern, a geometrical pattern, a polishing pattern, a coating pattern, or the like.

Additionally, the embossing process may form a concavo-convex pattern by using a method other than etching, and for example, the pattern may be formed by carving, a machining process, or polishing lines. Moreover, in the embossing process, a concavo-convex pattern may be partially formed by the mold surface 12a of the molding mold 12. In this case, the mold surface 12a of the molding mold 12 without embossing formed thereon is formed into a mirror surface.

The resin molding mold 10 includes the buffer layer 16 formed on the entire surface of the mold surface 12a of the molding mold 12. Additionally, the buffer layer 16 may be formed only on one portion of the mold surface 12a of the molding mold 12.

The buffer layer 16 includes at least a thermosetting resin and fine particles 18. The buffer layer 16 is preferably formed so as to have a thickness in a range from 1.0 μm or more to 20 μm or less. Moreover, the thickness of the buffer layer 16 is preferably made larger than the particle size of the fine particles 18. Furthermore, the thickness of the buffer layer 16 is made at least smaller than the maximum height T between the embossing formation convex portion 14a and the embossing formation concave portion 14b formed by the embossing process. When the thickness of the buffer layer 16 is larger than the maximum height T between the embossing formation convex portion 14a and the embossing formation concave portion 14b formed by the embossing process, the embossing process is no longer carried out on the resin molded product. This buffer layer 16 may be formed on each of the two core mold and cavity mold, or a buffer layer 16 may be formed only on the cavity mold.

Additionally, the thickness of the buffer layer 16 can be measured by, for example, an electromagnetic eddy-current film thickness meter (made by Sanko Electronic Laboratory Co., Ltd., model number: SWT-9100).

With respect to the thermosetting resin to be used for the buffer layer 16, heat resistant property, mold-releasing property, adhesiveness to the mold surface 12a of the molding mold 12, wear resistance, etc. are required. With respect to the heat resistance, those which are not fused at a temperature of less than 100° C. are preferably used, and the curing temperature of the thermosetting resin is set in accordance with the heat resistant temperature of the molding mold 12. For example, in the case when the buffer layer 16 is formed on a molding mold 12 made of a material having a low melting point, such as aluminum, ZAS or the like, a thermosetting resin that is cured at a temperature range from 100° C. or more to 150° C. or less is used in accordance with the heat resistant temperature of the mold material. With respect to the wear resistance, those which have a sufficient wear resistance to the flow of fused matters of the resin at the time of an injection molding are preferably used. For example, in the case of a molding process by using a synthetic resin, for example, at the time of an injection molding process, those materials that are resistant to molding processes of 1000 shots or more are preferably used. This is because upon molding resin molded products, a large number of resin molded products are molded by using the same molding mold 12.

Moreover, in order to satisfy the above-mentioned requirements for the buffer layer 16, as the thermosetting resin to be used for the buffer layer 16, those materials having a high heat insulating property are used. For example, as the thermosetting resin to be used for the buffer layer 16, a thermosetting resin having a heat conductivity in a range from 0.10 W/(mK) or more to 0.99 W/(mK) or less is used.

As the thermosetting resin to be used for the buffer layer 16, a phenolic resin, an alkyd resin, a melamine urea resin, an epoxy resin, a polyurethane resin, a silicone resin, a chloride rubber-based resin, a vinyl acetate resin, an acrylic resin, a vinyl chloride resin, a fluorine resin, cellulose, a polystyrene resin, or the like may be used, and ether a single substance or a copolymer may be used.

With respect to fine particles 18 contained in the buffer layer 16, fine particles of urethane or acrylic resin having flexibility are used. The fine particles 18 are concentrated in the vicinity of the surface layer of the buffer layer 16. As the fine particles 18, those particles having a light specific gravity relative to the thermosetting resin contained in the buffer layer 16 are used. The fine particles 18 have a bulk specific gravity in a range from 0.4 g/ml or more to 0.9 g/ml or less. When the bulk specific gravity becomes smaller than 0.4 g/ml, handling thereof becomes difficult. When the bulk specific gravity becomes greater than 0.9 g/ml, the fine particles 18 become difficult to be located in the vicinity of the surface layer of the buffer layer 16. Moreover, the fine particles 18 may have a true specific gravity in a range from 1.0 g/cm$^3$ or more to 1.3 g/cm$^3$ or less. When the true specific gravity becomes smaller than 1.0 g/cm$^3$, handling thereof becomes difficult. When the true specific gravity becomes greater than 1.3 g/cm$^3$, the fine particles 18 become difficult to be located in the vicinity of the surface layer of the buffer layer 16.

Moreover, the material of the fine particles 18 has a heat resistance higher than that of the thermosetting resin used for the buffer layer 16. Furthermore, the material of the fine particles 18 has a solvent resistant property to the thermosetting resin used for the buffer layer 16.

In this case, the fine particles 18 have a substantially spherical shape, and the particle size thereof is set in a range from 1.0 μm or more to 15 μm or less. This is because the thickness of the buffer layer 16 needs to be set to 1.0 μm or more. Moreover, the particle size of the fine particles 18 needs not to be uniform, but may be at random. Furthermore, the fine particles 18 preferably have an elastic property. Additionally, since the particle size of the fine particles 18 is smaller than the maximum height T between the embossing formation convex portion 14a and the embossing formation concave portion 14b derived from the embossing process, no influences are given to the shape of the embossing process carried out on the resin molded product.

In the case when such fine particles 18 are used, since the fine particles 18 are concentrated on the vicinity of the surface (upper layer side) of the buffer layer 16, a plurality of gloss adjusting convex portions 20 having substantially spherical shapes derived from the fine particles 18 are formed on the surface of the buffer layer 16, as shown in FIG. 2. The protruding height t1 from the surface of the buffer layer 16 on each of the plural gloss adjusting convex portions 20 has a size that is different depending on the respective gloss adjusting convex portions 20. Moreover, some of the plural substantially spherical shaped gloss adjusting convex portions 20 may be formed by allowing the fine particles 18 to be exposed from the surface of the buffer layer 16. Furthermore, on the surface of the buffer layer 16, within a region where no gloss adjusting convex portions 20 are formed, a flat-face maintaining part 22 is formed. The flat-face maintaining part 22 forms a substantially flat face on the molded surface of the resin molded product. On the other hand, on the lower layer side of the buffer layer 16, a fewer number of the fine particles 18 are present.

Additionally, the particle size of the fine particles 18 can be measured, for example, by using a microscope in enlarged observations.

2. Production Method of Resin Molding Mold

The following description will discuss a production method of a resin molding mold in accordance with the present invention.

First, a molding mold 12 subjected to an embossing process is prepared. By this embossing process, on a mold surface 12a of the molding mold 12, an embossing formation convex portion 14a and an embossing formation concave portion 14b are formed. As a base material for the molding mold 12, a material capable of being heated at least to 150° C. can be used, and for example, a metal material, such as iron steel material, aluminum, ZAS or the like, and a synthetic resin material may be used.

Moreover, on the mold surface 12a of the molding mold 12, if necessary, an embossing process for forming a concavo-convex shaped pattern, such as leather embossing, geometrical embossing, satin embossing or the like, is carried out. The embossing pattern is selected from the group consisting of a leather embossing pattern, a skin texture pattern, a wood grain pattern, a satin pattern, a leaf vein pattern, a scale pattern, a marble pattern, a hair line pattern, a geometrical pattern, a polishing pattern, a coating pattern and the like.

Furthermore, in order to form a buffer layer 16 in a process to be carried out later, the mold surface 12a of the molding mold 12 is degreased and washed.

Next, the buffer layer 16 is formed on the mold surface 12a of the molding mold 12.

First, in order to form the buffer layer 16, a thermosetting resin and fine particles 18 are prepared. Then, a mixed solution which is formed by dispersing the thermosetting resin and the fine particles 18 thus prepared in a solvent is prepared.

With respect to the thermosetting resin to be used for the formation of the buffer layer 16, a phenolic resin, an alkyd resin, a melamine urea resin, an epoxy resin, a polyurethane resin, a silicone resin, a chloride rubber-based resin, a vinyl acetate resin, an acrylic resin, a vinyl chloride resin, a fluorine resin, cellulose, a polystyrene resin, or the like is used, and ether a single substance or a copolymer may be used.

As the fine particles 18 to be contained in the buffer layer 16, fine particles of urethane or acrylic resin having flexibility are used. As the fine particles 18, those particles having a light specific gravity relative to the thermosetting resin contained in the buffer layer 16 are used. The fine particles 18 have a bulk specific gravity in a range from 0.4 g/ml or more to 0.9 g/ml or less. Moreover, the fine particles 18 may have a true specific gravity in a range from 1.0 g/cm³ or more to 1.3 g/cm³ or less. Further, the material of the fine particles 18 has a heat resistance higher than that of the thermosetting resin used for the buffer layer 16. Furthermore, the material of the fine particles 18 has a solvent-resistant property relative to the thermosetting resin used for the buffer layer 16.

The particle size of the fine particles 18 is set in a range from 1.0 μm or more to 15 μm or less, and those fine particles 18, which have a particle size smaller than the maximum height between the embossing formation convex portion 14a and the embossing formation concave portion 14b derived from the embossing process and formed on the molding mold 12, are selected. Moreover, the fine particles 18 have a substantially spherical shape, and the particle size thereof needs not to be uniform, but may be at random. Furthermore, the fine particles 18 preferably have an elastic property.

As a solvent to be used for forming the buffer layer 16, propylene glycol monomethyl ether acetate, propylene glycol monomethyl ether, n-butyl acetate, n-butyl alcohol, methyl alcohol and ethylene glycol monomethyl ether acetate may be used.

Successively, in order to form the buffer layer 16, the mixture thus prepared is coated onto the mold surface 12a of the molding mold 12 by using, for example, a spraying method so as to have a thickness in a range from 1.0 μm or more to 20 μm or less.

The spraying conditions of the mixed solution for forming the buffer layer 16 are set so that, for example, a coating pressure (pneumatic pressure) is 0.25 MPa, the diameter of a spray gun is 0.8 mm and a coating distance is in a range from 15 cm or more to 40 cm or less. Moreover, the spraying process is carried out in possibly a vertical direction relative to the mold surface 12a of the molding mold 12 to be coated. This arrangement is made so as to allow the buffering layer 16 to be coated uniformly on the mold surface 12a of the molding mold 12. The place in which the coating is carried out is, for example, a coating room.

Additionally, the buffer layer 16 may be formed not only on the entire surface of the mold surface 12a of the molding mold 12, but also on a partial portion thereof.

Thereafter, the molding mold 12 coated with the mixed solution is baked at a baking temperature from 100° C. or more to 150° C. or less for 2 hours or more to 5 hours or less so that the buffer layer 16 is formed on the mold surface 12a of the molding mold 12; thus, a resin molding mold 10 is obtained.

3. Resin Molded Product

By using this resin molding mold 10, an injection-molding process is carried out using a thermosetting resin heated and melted. The materials of the thermoplastic resin to be molded by using the present resin molding mold 10 include, for example, polypropylene (PP), an ABS resin that is a copolymer synthetic resin of acrylonitrile, butadiene and styrene, polyvinyl chloride (PVC), etc. Moreover, with respect to the thickness of the resin molded product, not particularly limited, molded products having a desired thickness may be produced.

As shown in FIG. 3, a plurality of concave portions 110 having substantially spherical shapes are formed on the surface of the resin molded product 100 molded by using the resin molding mold 10. The depths on the inner surface of the plural concave portions 110 having substantially spherical shapes are different depending on the concave portions 110 having substantially spherical shapes.

Figure 6:
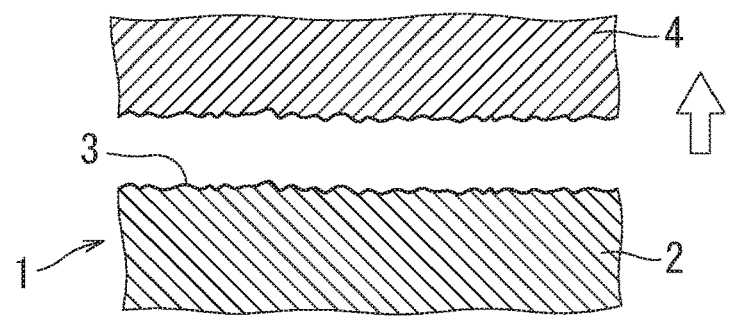
FIG. 6 is a cross-sectional illustration showing a state in which a resin molded product, which has been injection-molded by using a molding mold that is designed to suppress gloss by blasting beads thereon, is drawn therefrom.

Upon forming a resin molded product on which embossing is formed by using a conventional resin molding mold 1, in order to reduce gloss on the surface of the resin molded product, a molding process has been carried out by using a resin molding mold 1 with fine concavo-convex faces 3 being formed on the surface of the molding mold by blasting glass beads, sand or the like onto the mold surface of the molding mold 2, as shown in FIG. 6. In this case, irregularities sometimes occur in a region to which glass beads, sand or the like are blasted, or the mold surface of the molding mold 2 sometimes tends to have steep ridges. In the case when a resin molded product 4 is formed by using the molding mold 2 having such a surface, scratches tend to be easily caused on the resin molded product 4 due to galling, tension or rubbing at the time of drawing the resin molded product 4 from the molding mold 1 by contraction at the time of cooling the resin molded product 4. For this reason, these scratches make it difficult to reduce gloss entirely in a stable manner from the surface of the resin molded product 4, and also cause white blurring.

In accordance with the resin molding mold 10, it becomes possible to avoid occurrence of scratches due to galling, tension or rubbing on the resin molded product 100 having embossing at the time of drawing the resin molded product 100 from the resin molding mold 10, and consequently to obtain the resin molded product 100 capable of preventing white blurring from occurring on a surface on which the embossing is formed. That is, as shown in FIG. 3, since gloss adjusting convex portions 20 having substantially spherical shapes are formed on the surface of the buffer layer 16, a state having steep ridges is hardly caused on the mold surface 12a of the molding mold 12.

Therefore, in the case when a resin molded product 100 is molded by carrying out an injection-molding process by using the resin molding mold 10, since the concave portions 110 formed on the embossing formation surface of the resin molded product 100 have substantially spherical shapes, it is possible to avoid occurrence of scratches on the surface of the resin molded product 100 due to tension or rubbing caused by galling at the time of drawing the resin molded product 100 from the resin molding mold 10, even when the resin molded product 100 is contracted at the time of cooling, and consequently to obtain the resin molded product 100 having reduced gloss; therefore, it becomes possible to obtain the resin molded product 100 capable of preventing white blurring from occurring on the embossing formation surface.

Moreover, when light is made incident on the surface of the resin molded product 100 formed by using the resin molding mold 10, the incident light is reflected from inner surfaces of the concave portions 110 having substantially spherical shapes of the resin molded product 100 to form diffused light rays that are reflected in various directions. Since the incident light is randomly reflected, reflected light rays to reach the eyes of an observer become fewer. Since a large number of concave portions 110 having substantially spherical shapes with different depths are formed on the surface of the resin molded product 100, the gloss (gloss value) of the entire resin molded product 100 is lowered.

In this manner, since the surface of the resin molded product 100 molded by using the resin molding mold 10 in accordance with the present embodiment has a glossless surface characteristic, it is not necessary to further carry out a coating process on the corresponding resin molded product, and it becomes possible to obtain a desired resin molded product 100 whose texture is improved by reducing gloss.

Moreover, in accordance with the resin molding mold 10, since the particle size of the fine particles 18 contained in the buffer layer 16 is set in a range from 1.0 μm or more to 15 μm or less, the embossing formation concave portion 14b to be formed by embossing process are not buried; therefore, it is possible to avoid generation of galling or the like, while maintaining the shape of the embossing pattern of the resin molded product 100.:

Furthermore, in accordance with the resin molding mold 10, since the thickness of the buffer layer 16 is set in a range from 1.0 μm or more to 20 μm or less, and is also made larger than the particle size of the fine particles 18, it is possible to positively maintain the shape of the plural gloss adjusting convex portions having substantially spherical shapes derived from the fine particles 18 on the surface of the buffer layer 16.

EXPERIMENTAL EXAMPLE

Experiments were carried out in which a test plate of a resin molding mold in which a buffer layer 16 was formed on a molding mold 12 serving as an example and a test plate of a resin molding mold in which no buffer layer was formed on the molding mold serving as a comparative example were prepared, and the respective test plates of the resin molding molds and the test plates of the resin molded products molded by the resin molding molds were evaluated. The evaluation was carried out by measuring the gloss value of the mold surface of each of the test plates of the resin molding molds and the embossing formation surface of each of the test plates of the resin molded products. Moreover, the evaluation was also carried out by confirming the presence/absence of occurrence of white blurring on the embossing formation surface of the test plate of the resin molded product.

1. Resin Molding Mold

WORKING EXAMPLES

All the base materials of test plates of molding molds of working example 1 to working example 7 were made by carbon steel for machine structural use (S50C). Moreover, the size of each of test plates of resin molding molds of working example 1 to working example 7 was set to 220 mm in longitudinal size, 320 mm in lateral size and 10 mm in thickness.

Furthermore, in working example 1 to working example 7, by using the conventional method, embossing processes for respectively different patterns were carried out. Additionally, in working example 1 to working example 7, the maximum height T between embossing formation convex portions and embossing formation concave portions by the embossing process was set to 50 μm or more. On the mold surface of the test plate of each of the molding molds of working example 1 to working example 7, a buffer layer was formed. An acrylic resin was used as a resin contained in these buffer layers, and as fine particles, urethane fine particles having a bulk specific gravity in a range from 0.4 g/ml or more to 0.9 g/ml or less were used. Moreover, the particle size of the fine particles was set in a range from 1.0 μm or more to 12 μm or less. Furthermore, the thickness of the buffer layer formed on the mold surface of the test plate of each of the molding molds of working example 1 to working example 7 was set in a range from 1.0 μm or more to 20 μm or less.

In working example 1 to working example 7, spraying conditions of the mixed solution for forming the buffer layer were set as follows.

Coating pressure (pneumatic pressure): 0.25 MPa
Diameter of spray gun: 0.8 mm
Coating distance: 30 mm or more to 40 mm or less
Coating direction: possibly vertical to mold surface of molding mold
Coating place: coating room
Thickness of coating: 18 μm

COMPARATIVE EXAMPLE

A test plate of a molding mold in accordance with comparative example 1 is subjected to a series of embossing processes including a surface treatment by sand blasting and glass beads in the same manner as in the embossing processes carried out on the molding mold of working example 1, and also corresponds to a test plate on which no buffer layer is formed. In the following description, test plates of molding molds in accordance with comparative example 2 to comparative example 7 are subjected to a series of embossing processes including a surface treatment by sand blasting and glass beads, in the same manner as in the embossing processes respectively carried out on working example 2 to working example 7, and also correspond to test plates on which no buffer layer is formed. Moreover, all the base materials of molding molds of comparative example 1 to comparative example 7 were made by carbon steel for machine structural use (S50C). The size of each of the test plates of comparative example 1 to comparative example 7 was also set to the same size as the test plates of working example 1 to working example 7.

2. Resin Molded Product

Figure 4:
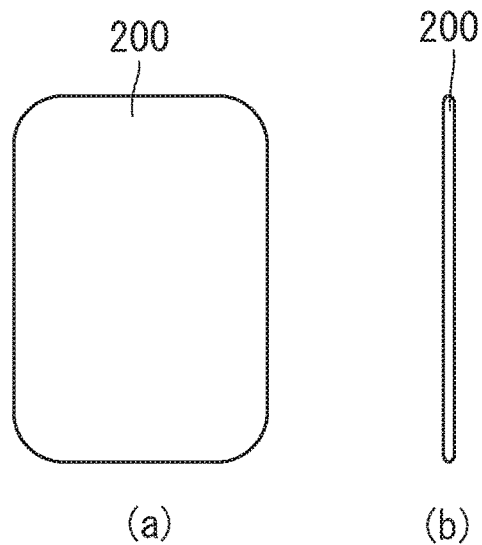
FIG. 4(a) and FIG. 4(b) show an external appearance of a test plate of a resin molded product used in an experiment.

FIG. 4 shows an external appearance of a test plate of a resin molded product used for experiments, and FIG. 4(a) is a front view, and FIG. 4(b) is a side view.

Injection-molding processes for molding resin molded products of working example 1 to working example 7 as well as comparative example 1 to comparative example 7 were carried out by a conventional injection molding method. Moreover, polypropylene (PP) was used as the materials for all the resin molded products of working example 1 to working example 7 as well as comparative example 1 to comparative example 7. Furthermore, the size of the resin molded products of working example 1 to working example 7, as well as comparative example 1 to comparative example 7, was set to 200 mm in longitudinal width, 300 mm in lateral width and about 3 mm in thickness.

(Measuring Method)

The gloss value (gloss degree of Gs (60°)) of the mold surface 12a of the test plate of the molding mold 12 was measured by using a gloss meter made by KONIKA MINOLTA, Inc. (trade name: UNI GLOSS GM-60). Gs (60°) refers to mirror surface gloss (degree) at a measuring angle of 60 degrees.

The mirror surface gloss degree was measured by the following method in accordance with a measuring method specified by JIS Z8741-1997 "Mirror Surface Gloss Degree-Measuring Method". That is, by using a mirror surface gloss degree measuring device in compliance with the above-mentioned standard, the reflectance of the surface was measured under a condition of incident angle=60°. Next, the measured value was converted to a percentage when the gloss degree on the reference surface is defined as 100, and represented as the mirror surface gloss degree. With respect to the reference surface, a black glass reference surface having a refractive index set to a constant value 1.567 all over the visible wavelength range, as specified by the above-mentioned standard was used, and when the incident angle=60°, a mirror surface reflectance of 10% was defined as a gloss degree 100. By using the gloss meter made by KONIKA MINOLTA Inc. (trade name: UNI GLOSS GM-60) corresponding to a mirror surface gloss measuring device which, when measurements are carried out, automatically carries out the above-mentioned conversion, and outputs a mirror surface gloss degree, the respective portions of the test plate surface were measured at N=5 under the condition of incident angle=60°, and the average value was defined as the mirror surface gloss degree of each of the test plate surfaces. Additionally, as the gloss value (gloss degree) becomes lower, the corresponding state means a gloss reduced state.

The gloss value (gloss degree of Gs (60°)) of the surface of the test plate relating to a resin molded product was also measured by using the same method as the measuring method of the gloss value of the mold surface of the test plate of the molding mold, and measurements were carried out by using the gloss meter made by KONIKA MINOLTA, Inc. (trade name: UNI GLOSS GM-60) in accordance with JIS Z 8741.

Table 1 shows evaluation results of working example 1 to working example 7. Moreover, Table 2 shows evaluation results of comparative example 1 to comparative example 7.

TABLE 1

| | Mold surface having embossing of molding mold Average value (N = 5) of gloss value | Embossing formation surface of resin molded product Average value (N = 5) of gloss value |
|---|---|---|
| Working Example 1 | 1.4 | 1.6 |
| Working Example 2 | 1.5 | 1.4 |
| Working Example 3 | 1.4 | 2.0 |
| Working Example 4 | 1.7 | 1.9 |
| Working Example 5 | 1.2 | 1.6 |
| Working Example 6 | 1.5 | 1.6 |
| Working Example 7 | 1.4 | 1.4 |

TABLE 2

| | Mold surface having embossing of molding mold Average value (N = 5) of gloss value | Embossing formation surface of resin molded product Average value (N = 5) of gloss value |
|---|---|---|
| Comparative Example 1 | 5.0 | 2.6 |
| Comparative Example 2 | 8.7 | 2.3 |
| Comparative Example 3 | 6.0 | 3.3 |
| Comparative Example 4 | 11.0 | 4.3 |
| Comparative Example 5 | 6.1 | 2.6 |
| Comparative Example 6 | 10.3 | 4.1 |
| Comparative Example 7 | 8.0 | 3.2 |

Upon consideration of the average value of gloss values on the mold surface having embossing of the molding mold, it is in a range from 1.4 to 1.7 in working example 1 to working example 7, and it is in a range from 5.0 to 11.0 in comparative example 1 to comparative example 7; therefore, it is confirmed that the gloss is greatly lowered by forming a buffer layer on the mold surface of the molding mold.

Moreover, upon consideration of the average value of gloss values on the embossing formation surface of a resin molded product, it is in a range from 1.4 to 2.0 in working example 1 to working example 7, and it is in a range from 2.3 to 4.3 in comparative example 1 to comparative example 7; therefore, it is confirmed that in the case of a resin molded product injection-molded by using a resin molding mold with a buffer layer formed on the mold surface of the molding mold, the gloss is greatly lowered.

Next, the presence/absence of occurrence of white blurring on the embossing formation surface of the test plate of a resin molded product was confirmed.

Figure 5:
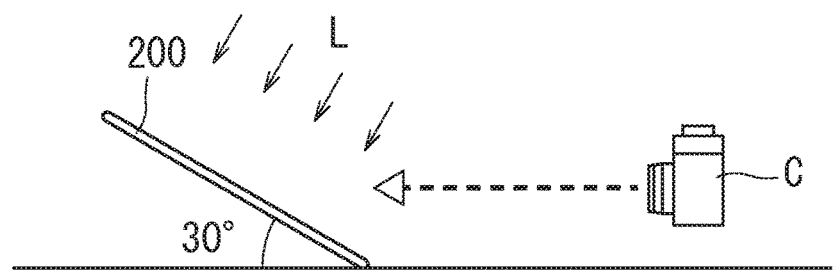
FIG. 5 is a schematic view showing a state of an experiment carried out for confirming the presence/absence of occurrence of white blurring in a resin molded product used in the experiment.

The confirmation of the presence/absence of occurrence of white blurring was carried out by photographing each of test plates of resin molded products by a camera under predetermined conditions, and the resulting images were visually confirmed respectively. The photographing process of the embossing formation surface of the test plates of the resin molded products was carried out under conditions shown in FIG. 5. FIG. 5 is a schematic view showing a state of an experiment carried out so as to confirm the presence/absence of occurrence of white blurring on the resin molded product used for the experiment. That is, first, a test plate 200 was tilted from the reference surface by 30°. Then, with sun light L being directed to the surface for use in measuring the gloss value of the test plate 200, the test plate 200 was photographed by a camera C in a direction in parallel with the reference surface.

As a result of confirmation on the presence/absence of occurrence of white blurring, on any of the embossing formation surfaces of the test plates of resin molded products of working example 1 to working example 7, no white blurring occurred. On the other hand, on any of the embossing formation surfaces of the test plates of resin molded products of comparative example 1 to comparative example 7, it was confirmed that white blurring occurred in wide regions.

Based upon the above-mentioned evaluation results, it is confirmed that by allowing the buffer layer formed on the mold surface of the molding mold to contain fine particles having a bulk specific gravity in a range from 0.4 g/ml or more to 0.9 g/ml or less, as well as by forming a plurality of convex portions having substantially spherical shapes derived from the fine particles on the surface of the buffer layer, a resin molded product on which gloss on the embossing formation surface of the resin molded product is lowered and the occurrence of white blurring is also suppressed can be obtained.

REFERENCE SIGNS LIST 10 resin molding mold
12 molding mold
12a mold surface
14a embossing formation convex portion
14b embossing formation concave portion
16 buffer layer
18 fine particles
20 gloss adjusting convex portion
22 flat-face maintaining part
100 resin molded product
110 concave portion
T maximum height between embossing formation convex portion and embossing formation concave portion
t1 protruding height from surface of buffer layer 16 on gloss adjusting convex portion
L sun light
C camera

The invention claimed is:

1. An embossed resin molding mold having a plurality of gloss adjusting convex portions for use in molding a resin molded product having embossing, comprising:
   a molding mold; and
   a buffer layer that is formed on a mold surface of the molding mold, and that comprises a mixture of a thermosetting resin; and fine particles having substantially spherical shapes,
   wherein the fine particles have a bulk specific gravity ranging from 0.4 g/ml to 0.9 g/ml, and a particle size ranging from 1.0 µm to 15 µm and that is random, and
   wherein an exposed surface of the buffer layer has formed thereon a plurality of gloss adjusting convex portions having substantially spherical shapes that are derived from the fine particles wherein the buffer layer has a thickness that ranges from 1 µm to 20 µm, and that is larger than the particle size of the fine particles.

2. The embossed resin molding mold according to claim 1, wherein the fine particles comprise fine particles that have flexibility and are comprised of urethane or acrylic resin.

* * * * *